Nov. 25, 1952     E. W. FISHBURNE     2,618,810
FISH SCALER AND SKINNER
Filed Oct. 3, 1949
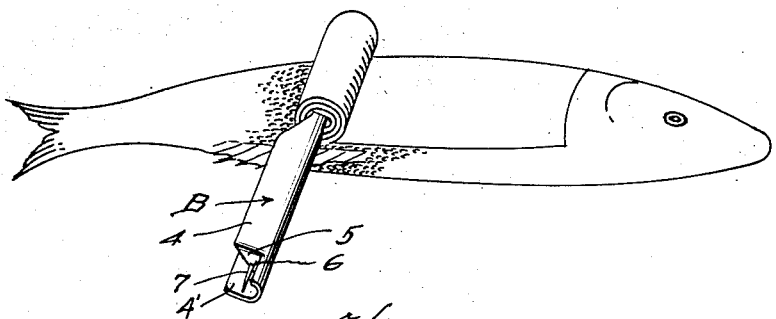
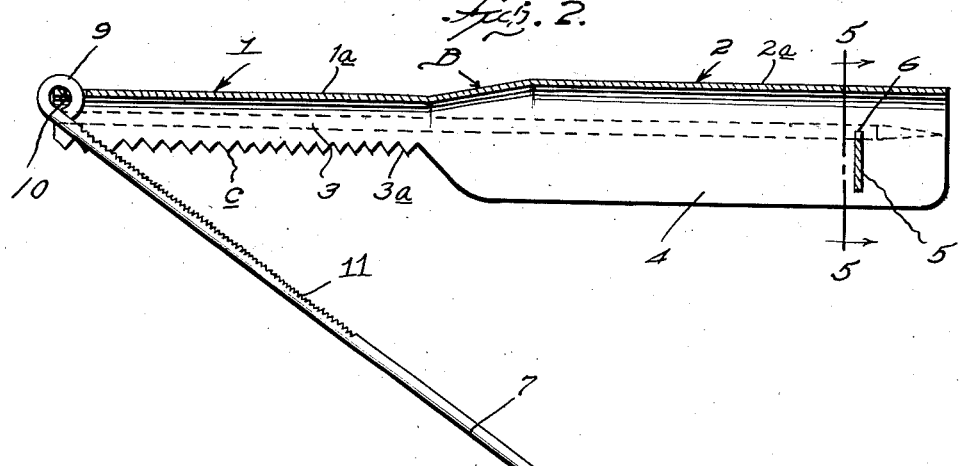
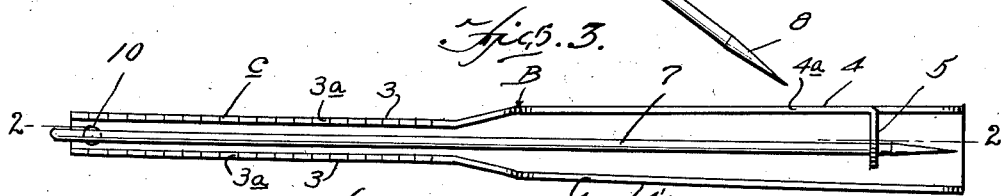
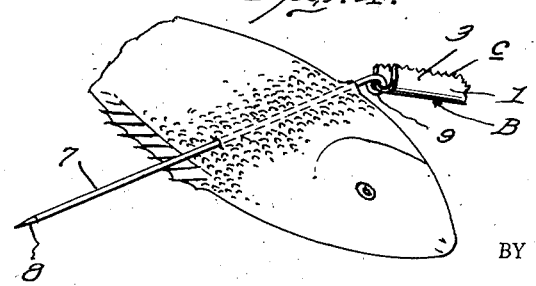
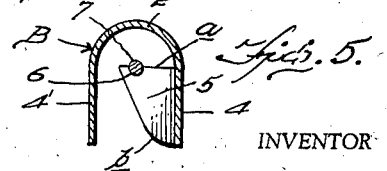
INVENTOR
*Edward W. Fishburne*
BY *Wilfred E. Lawson*
ATTORNEY Patented Nov. 25, 1952

2,618,810

UNITED STATES PATENT OFFICE 2,618,810

FISH SCALER AND SKINNER

Edward Winburn Fishburne, Chicago, Ill., assignor to F & M Mfg. Co., Inc., Chicago, Ill., a corporation of Illinois Application October 3, 1949, Serial No. 119,280

1 Claim. (Cl. 17—7)

This invention relates to a fish scaler and skinner and it is an object of the invention to provide a device of this kind which is simple in construction yet effective for the uses to which it may be put.

It is also an object of the invention to provide a device of this kind including an elongated member having an end portion formed to engage effectively a fish for scaling or skinning and wherein said end portion is provided with means for holding said end portion in close clamping engagement with the skin of the fish to facilitate the skinning operation.

The invention consists in the details of construction and in the combination and arrangement of the several parts of my improved fish scaler and skinner, whereby certain advantages are attained, as will be hereinafter more fully set forth.

In order that my invention may be better understood, I will now proceed to describe the same with reference to the accompanying drawing, wherein:

Figure 1 is a view in perspective of a device constructed in accordance with an embodiment of the invention and in use for skinning;

Figure 2 is an enlarged sectional view taken substanitally on the line 2—2 of Figure 3, showing the device as herein comprised with the needle in a substantially half way open position;

Figure 3 is a bottom plan view of the device as shown in Figure 2 with the needle in fully closed position;

Figure 4 is a fragmentary view in perspective illustrating the initial step when the device is to be used as a skinner; and Figure 5 is a detail sectional view taken substantially on the line 5—5 of Figure 2.

In the embodiment of the invention as illustrated in the accompanying drawings, B denotes an elongated body member of sheet metal which is bent U-shaped in cross section from one end to the other. The member B comprises a front or scraping end portion 1 and a rear or handle portion 2. The back 1a of the front or scraping portion 1 is inwardly offset with respect to the back 2a of the rear or handle portion 2 as are also the free edges 3a of the side walls 3 of the front portion, with respect to the corresponding edges 4a of the side walls 4 and 4' of the handle portion, consequently, the side walls 3 are of a width materially less than the width of the side walls 4 and 4' and, as is clearly indicated in Figure 3, the side walls 4 and 4' are spaced apart to be outwardly offset with respect to the side walls 3. The free longitudinal edges 3a of the walls 3 are toothed or serrated, as at c, to facilitate the use of the device as a scraper, and to prevent skin slipping when the device is used for skinning.

One of the side walls designated 4, has struck therefrom, in close proximity to the outer or free end thereof an inwardly disposed keeper plate 5 substantially perpendicular to the wall 4. The inner straight single edge a of the plate 5 adjacent to its free end portion is provided with a notch or recess 6 to receive the free end portion of the needle 7 for a purpose to be hereinafter pointed out.

The free end edge b of the keeper plat 5 is on an angle to facilitate the passage of the needle for desired engagement within the notch or recess 6.

The free end portion 8 of the needle 7 is pointed and the opposite end portion is provided with a circular returned part forming an eye 9 which freely passes through an opening 10 in the back wall 1 closely adjacent to the outer end. This mounting for the needle 7 permits the same to have free swinging movement and it is to be noted the needle 7 is substantially the same length as the length of the body B. The needle 7 is substantially housed within the body B when the free end portion of the needle 7 is engaged with the straight edge a of the plate 5.

The inner marginal portion of the needle 7 is roughened, as at 11, from the part 9 outwardly of the needle 7 for a distance substantially equal to the length of the forward or scraping portion of the body B.

When the device is used in skinning a fish, the needle 7 is inserted through the fish just below the skin and at a point close to the head of the fish (Figure 4). The needle 7 is then moved into closed position with the free end portion of the needle engaged with the straight edge a of the plate 5. The skin of the fish is then cut across immediately behind the forward portion of the body B and then the rear or handle portion of the body B is turned toward the tail end of the fish (Figure 1), winding the skin around the forward or scraping end portion of the body and thus strip off the skin.

From the foregoing description it is thought to be obvious that a fish scaler and skinner constructed in accordance with my invention is particularly well adapted for use by reason of the convenience and facility with which it may be assembled and operated.

I claim:

In a scaling and skinning tool for fish, an elongated body of sheet metal of substantially U-shape in cross-section from end to end providing spaced side walls and a back and having one end of its back provided with an opening, an elongated needle having one end formed with an eye engaged in said aperture for pivotal swinging movements relatively to said body and its other end pointed, and a keeper for the pointed end of said needle constituted in an inwardly disposed plate projecting from one side wall of said body at the opposite end thereof, said plate having a notch in its inner edge to be engaged by the pointed end of the needle for the retention of the needle housed between the side walls of said body when it is not in use, another edge of said plate being spaced from the other side wall of the body for the passage of the pointed end of the needle therebetween from and to engagement with the said notch.

EDWARD WINBURN FISHBURNE.

REFERENCES CITED

The following references are of record in the file of this patent:

UNITED STATES PATENTS

| Number | Name | Date |
|---|---|---|
| 1,884,525 | Bautista | Oct. 25, 1932 |
| 1,935,149 | Elvin | Nov. 14, 1933 |
| 2,206,257 | Kah | July 2, 1940 |